United States Patent
Gee et al.

(10) Patent No.: US 6,358,210 B2
(45) Date of Patent: Mar. 19, 2002

(54) MEDICAL DIAGNOSTIC ULTRASONIC IMAGING TRANSMIT/RECEIVE METHOD AND APPARATUS

(75) Inventors: Albert Gee, Los Altos; J. Nelson Wright, Menlo Park, both of CA (US)

(73) Assignee: Acuson Corporation, Mountain View, CA (US)

( * ) Notice: Subject to any disclaimer, the term of this patent is extended or adjusted under 35 U.S.C. 154(b) by 0 days.

(21) Appl. No.: 09/794,483

(22) Filed: Feb. 26, 2001

Related U.S. Application Data (63) Continuation of application No. 09/282,799, filed on Mar. 31, 1999, now abandoned.

(51) Int. Cl.[7] ............................................. A61B 8/00
(52) U.S. Cl. ....................................... 600/443; 600/453
(58) Field of Search ................................ 600/437, 441, 600/443, 447, 453, 454, 455, 458; 73/625, 626

(56) References Cited

U.S. PATENT DOCUMENTS

| | | |
|---|---|---|
| 4,848,356 A | 7/1989 | Nakamura et al. |
| 4,995,397 A | 2/1991 | Nishiyama et al. |
| 5,010,885 A | 4/1991 | Fink et al. |
| 5,163,434 A | 11/1992 | Kumazawa |
| 5,632,277 A | 5/1997 | Chapman et al. |
| 5,675,554 A | 10/1997 | Cole et al. |
| 5,706,819 A | 1/1998 | Hwang et al. |
| 5,827,188 A | 10/1998 | Wright et al. |
| 5,876,341 A | 3/1999 | Wang et al. |
| 5,951,478 A | 9/1999 | Hwang et al. |
| 5,980,459 A | 11/1999 | Chiao et al. |

OTHER PUBLICATIONS

U.S. Patent Application Serial No. 09/191,034, filed Nov. 12, 1998.
U.S. Patent Application Serial No. 09/198,219, filed Nov. 23, 1998.

*Primary Examiner*—Marvin M. Lateef
*Assistant Examiner*—Ali M. Imam
(74) *Attorney, Agent, or Firm*—Brinks Hofer Gilson & Lione (57) ABSTRACT

An ultrasonic imaging system and method form first and second transmit beams characterized by a complex phase separation angle (e.g. 90°) that differs from an integer multiple of 180° along the same steering angle. First and second backscattered signals are received in response to these transmit beams, and the first and second backscattered signals are combined in a weighted sum. By properly selecting the weighting factors and the separation angle, the resulting combined signal can be provided with various advantageous features, such as a selective reduction in negative frequency components, a selective enhancement of fundamental frequency components, or a selective enhancement of harmonic frequency components.

46 Claims, 4 Drawing Sheets

MEDICAL DIAGNOSTIC ULTRASONIC IMAGING TRANSMIT/RECEIVE METHOD AND APPARATUS

This application is a continuation of application Ser. No. 09/282,799, filed Mar. 31, 1999, now abandoned, which is hereby incorporated by reference herein.

BACKGROUND

This invention relates to medical diagnostic ultrasonic imaging, and in particular to methods and apparatus for reducing sampling rate requirements in ultrasonic imaging and for improving fundamental/harmonic separation.

Modern ultrasound imaging systems using digital techniques for receive beamformation are limited in their frequency coverage by practical sample rates of analog-to-digital converters for reception. Standard practice involves sampling rates at or near four times the system carrier frequency; this permits complex baseband demodulation in the digital domain using simple, low-distortion techniques. A system with, for example, 40 MHz sampling is thus practically limited to 10 MHz imaging.

One object of certain embodiments of the present invention is to increase the useful imaging frequency, relative to the sampling frequency, by a factor of two. In the example above, a system capable of 40 MHz sampling can be extended to 20 MHz imaging.

Harmonic imaging is an increasingly important imaging mode for ultrasound imaging systems. In harmonic imaging the target is insonified with ultrasonic energy in a fundamental frequency band, and echoes from the target at a harmonic of the fundamental frequency band are imaged. In such systems it becomes important to suppress echo signals in the fundamental frequency band, and in the past this has been accomplished with the use of filters and with two-pulse cancellation techniques.

Another object of other embodiments of the present invention is to improve the suppression of either fundamental or harmonic echo signals in an ultrasonic imaging system.

SUMMARY

This invention is defined by the following claims, and nothing in this section should be taken as a limitation on those claims.

By way of introduction, the methods and apparatus described below acquire a complex signal as a function of a backscattered signals from plurality of transmit beams. These transmit beams are created using separate respective components (such as the real part and the imaginary part) of a desired complex insonification signal, and the corresponding echo signals are combined in various ways to obtain important advantages. As explained below, the echo signals can be combined to emphasize linear echoes and to allow the sampling rate for backscattered echo signals to be made as low as two times the central carrier frequency $f_O$ of the backscattered signals. The backscattered echo signals can be combined in other ways to selectively enhance either the fundamental or the harmonic components of backscattered signals that include non-linear components.

DETAILED DESCRIPTION OF THE PREFERRED EMBODIMENTS

In the prior art each transmit excitation involves a plurality of channels, each channel associated with a distinct signal, to effect a transmit beam. The transmit excitation is followed by reception, in which processing is applied to signals sensed on a plurality of channels to effect a colinear receive beam. Multiple beam techniques extend this method using superposition to effect a plurality of beams from each transmit excitation.

The methods and systems described below are designed to reduce sampling rate requirements and/or to suppress interference between fundamental and harmonic signals. The disclosed embodiments achieve these results by removing unwanted frequency spectra. The unwanted frequency spectra that are removed can be any desired combination of the following:

(1) The negative image of the fundamental frequency;
(2) The negative image of the harmonic frequency;
(3) The positive image of the fundamental frequency; and
(4) The positive image of the harmonic frequency.

The benefits of removing such unwanted frequency spectra include the following:

(1) Potentially lowering the overall frequency bandwidth, thereby reducing the sampling rate requirement; and
(2) Suppressing interference between fundamental and harmonic frequency spectra, thereby decreasing range artifacts and increasing range resolution.

The embodiments described below form a linear combination of n receive signals, $g_k(t)$. These receive signals are associated with respective phase shifted transmit pulses $h_k(t)$. Each individual transmit pulse $h_k(t)$ can be expressed as follows:

$$h_k(t) = \text{Re}\{a(t)e^{j2\pi f_o t + j\theta_k}\}$$

$$= \frac{1}{2}\{a(t)e^{(2\pi f_o t + \theta_k)} + a^*(t)e^{-(2\pi f_o t + \theta_k)}\}.$$

For the nonharmonic case, where the fundamental component of the receive signals is of interest, the receive signal $G_k(f)$ takes the following form:

$$G_k(f) = \Im[g_k(t)] = \tfrac{1}{2}\{e^{-j\theta_k}A^*(-(f+f_O)) + e^{j\theta_k}A(f-f_O)\}$$

The negative frequency image can be removed by using two transmit firings that represent solutions of the following equations:

$$\begin{bmatrix} e^{j\theta_0} & e^{j\theta_1} \\ e^{-j\theta_0} & e^{-j\theta_1} \end{bmatrix}\begin{bmatrix} C_0 \\ C_1 \end{bmatrix} = \begin{bmatrix} 1 \\ 0 \end{bmatrix},$$

In this equation, the top row of the final matrix is associated with positive fundamental frequencies (A) and the bottom row is associated with negative fundamental frequencies (A*).

When the combined receive signal is expressed in the form $$g(t) = C_0 g_0(t) + C_1 g_1(t),$$

and when $\theta_0$ is set equal to zero, the equation for $C_0$ and $C_1$ takes the following form:

$$\begin{bmatrix} C_0 \\ C_1 \end{bmatrix} = \frac{1}{e^{-j\theta_1} - e^{j\theta_1}} \begin{bmatrix} e^{-j\theta_1} & -e^{j\theta_1} \\ -1 & 1 \end{bmatrix} \begin{bmatrix} 1 \\ 0 \end{bmatrix} = \frac{1}{-2j\sin\theta_1} \begin{bmatrix} e^{-j\theta_1} \\ -1 \end{bmatrix}.$$

One solution to this equation sets $\theta_1$ equal to minus $\pi/2$, in which case $$\begin{bmatrix} C_0 \\ C_1 \end{bmatrix} = \frac{1}{2} \begin{bmatrix} 1 \\ j \end{bmatrix}.$$

Note, however, that there are many other solutions where $\theta_1$ is not equal to zero or $\pi$.

For the harmonic case, the receive signal $G_k(f)$ can be expressed as follows:

$$G_k(f) = \tfrac{1}{2}\{e^{-j2\theta_k}B^*(-(f+2f_O)) + e^{j\theta_k}A^*(f+f_O) + e^{j\theta_k}A(f-f_O) + e^{j2\theta_k}B(f-2f_O)\},$$

where A and A* are the positive and negative fundamental images and B and B* are the positive and negative harmonic images, respectively.

Many alternatives are possible. With two transmit firings, certain solutions retain the positive harmonic image (B) and remove the positive fundamental image (A) by solving the following equation:

$$\begin{bmatrix} 1 & e^{j2\theta_1} \\ 1 & e^{j\theta_1} \end{bmatrix} \begin{bmatrix} C_0 \\ C_1 \end{bmatrix} = \begin{bmatrix} 1 \\ 0 \end{bmatrix},$$

where $\theta_0$ is assumed to be equal to zero, and the top and bottom rows of the final matrix are associated with B and A, respectively. Alternately, the positive fundamental component (A) can be retained and the positive harmonic component (B) removed by solving the following equation:

$$\begin{bmatrix} 1 & e^{j2\theta_1} \\ 1 & e^{j\theta_1} \end{bmatrix} \begin{bmatrix} C_0 \\ C_1 \end{bmatrix} = \begin{bmatrix} 0 \\ 1 \end{bmatrix},$$

again assuming $\theta_0$ is equal to zero, and the top and bottom rows of the final matrix are associated with B and A, respectively.

In other embodiments, three transmit firings are used, and the associated receive signals combined. For example, three transmit firings can be used to retain the positive harmonic image (B), to remove the positive fundamental image (A), and to remove the negative harmonic image (B*) by solving the following equation:

$$\begin{bmatrix} 1 & e^{j2\theta_1} & e^{j2\theta_2} \\ 1 & e^{j\theta_1} & e^{j\theta_2} \\ 1 & e^{-j2\theta_1} & e^{-j2\theta_2} \end{bmatrix} \begin{bmatrix} C_0 \\ C_1 \\ C_2 \end{bmatrix} = \begin{bmatrix} 1 \\ 0 \\ 0 \end{bmatrix},$$

where the three rows of the final matrix are associated with B, A, and A*, respectively. This approach removes interferences and reduces the sampling rate.

Another approach is to retain the positive harmonic image (B), to remove the negative fundamental image (A*), and to remove the negative harmonic image (B*) to reduce the sampling rate by a factor of 2. This can be done by solving the following equation:

$$\begin{bmatrix} 1 & e^{j2\theta_1} & e^{j2\theta_2} \\ 1 & e^{-j\theta_1} & e^{-j\theta_2} \\ 1 & e^{-j2\theta_1} & e^{-j2\theta_2} \end{bmatrix} \begin{bmatrix} C_0 \\ C_1 \\ C_2 \end{bmatrix} = \begin{bmatrix} 1 \\ 0 \\ 0 \end{bmatrix},$$

where the three rows of the final matrix are associated with B, A*, and B*, respectively.

As another alternative, $\theta_1$ and $\theta_2$ can be selected to retain the positive fundamental image (A), to remove the positive harmonic image (B), and to remove the negative harmonic image (B*) by solving the following equation:

$$\begin{bmatrix} 1 & e^{j2\theta_1} & e^{j2\theta_2} \\ 1 & e^{j\theta_1} & e^{j\theta_2} \\ 1 & e^{-j2\theta_1} & e^{-j2\theta_2} \end{bmatrix} \begin{bmatrix} C_0 \\ C_1 \\ C_2 \end{bmatrix} = \begin{bmatrix} 0 \\ 1 \\ 0 \end{bmatrix},$$

where the three rows of the final matrix are associated with B, A, and A*, respectively.

Other embodiments involve four or more transmit firings. For example, with four transmit firings, the associated receive signals can be combined to retain only the positive harmonic image by solving the following equation:

$$\begin{bmatrix} 1 & e^{j2\theta_1} & e^{j2\theta_2} & e^{j2\theta_3} \\ 1 & e^{j\theta_1} & e^{j\theta_2} & e^{j\theta_3} \\ 1 & e^{-j\theta_1} & e^{-j\theta_2} & e^{-j\theta_3} \\ 1 & e^{-j2\theta_1} & e^{-j2\theta_2} & e^{-j2\theta_3} \end{bmatrix} \begin{bmatrix} C_0 \\ C_1 \\ C_2 \\ C_3 \end{bmatrix} = \begin{bmatrix} 1 \\ 0 \\ 0 \\ 0 \end{bmatrix},$$

where the four rows of the final matrix are associated with B, A, A*, and B*, respectively. This minimizes both harmonic/fundamental interference and sampling rate requirements. Another approach using four transmit firings retains only the positive fundamental image (A) by solving the following equation:

$$\begin{bmatrix} 1 & e^{j2\theta_1} & e^{j2\theta_2} & e^{j2\theta_3} \\ 1 & e^{j\theta_1} & e^{j\theta_2} & e^{j\theta_3} \\ 1 & e^{-j\theta_1} & e^{-j\theta_2} & e^{-j\theta_3} \\ 1 & e^{-j2\theta_1} & e^{-j2\theta_2} & e^{-j2\theta_3} \end{bmatrix} \begin{bmatrix} C_0 \\ C_1 \\ C_2 \\ C_3 \end{bmatrix} = \begin{bmatrix} 0 \\ 1 \\ 0 \\ 0 \end{bmatrix},$$

where the four rows of the final matrix are associated with B, A, A*, and B*, respectively. Note that for all of the above cases, there are many possible solutions. By using $\theta_k$ equal to zero, $\pi/4$, $\pi/2$, $\pi$, and so forth, the coefficients $C_i$ tend to be simpler and symmetrical.

In the foregoing discussion, $\theta_0$, $\theta_1$, $\theta_2$, $\theta_3$ are examples of complex phase angles, and the differences $(\theta_0-\theta_1)$, $(\theta_0-\theta_2)$, $(\theta_0-\theta_3)$ are examples of complex phase separation angles.

Note that the combined receive signal $g(t)$ takes the form $$g(t) = \sum_{i=o}^{i=n} C_i g_i(t),$$

where $C_i$ is the weighting factor for the respective backscattered signal $g_i(t)$. In this example, all of the summed backscattered signals are associated with spatially aligned receive beams, and the corresponding transmit beams are also spatially aligned. As discussed above, in many cases at least two of the weighting factors $C_i$ have differing magnitudes. In the foregoing examples, the transmit beams associated with the combined backscattered signals are respective components of a single complex insonification signal which differ in complex phase angle by a complex phase separation angle that differs from an integer multiple of 180° by more than X. In selected embodiments, X is greater than 1°, 5°, 10°, 20°, 40°, 60° or 80°.

The combined receive signal g(t) can be created in an ultrasonic transmit/receive method that comprises the following steps:

(a) forming a set of at least two transmit beams corresponding to at least three respective components of a complex insonification signal, each of the transmit beams characterized by a respective complex phase angle;

(b) receiving at least two backscattered signals in response to the transmit beams;

(c) weighting the backscattered signals with the weighting factors $C_i$, and (d) combining the weighted backscattered signals $C_i g_i(t)$ to form the combined receive signal. The transmit beams of the set are all spatially aligned with one another, as are the receive beams in the preferred embodiment.

Section I—Linear Case Embodiments

Method Steps

In the first embodiment of the invention described below, each beam involves two transmit excitations, each excitation followed by reception. The six steps of the method are as follows:

One: Create a transmit beam using the real part of the desired complex insonification signal (which is the superposition of the real parts of the per-channel complex signals) for a first transmit excitation.

Two: Receive the backscattered signal on a plurality of channels and effect a receive beam colinear with the transmit beam.

Three: Store the samples associated with the receive beam of step two; these samples can be stored after beamformation, or before beamformation, or at some intermediate stage of per-channel processing and summation.

Four: Repeat the first step, using the imaginary part of the desired complex insonification signal for a second transmit excitation.

Five: Repeat the second step.

Six: Multiply the samples associated with step five by j (the square root of negative one) and add each resulting sample to the corresponding sample of step two (having been stored in step three) to effect a complex representation of the signal resulting from the desired transmit/receive beams.

Signal Processing

The signal processing for the method steps described above can be performed as follows. Let the desired signal for any transmit channel be given by $$a(x,t)\exp\{j2\pi f_o t\}, \qquad (1)$$

where $a(x,t)$ is a complex bandlimited baseband signal associated with transmission from spatial location x and fo is the desired carrier frequency. The real and imaginary parts of eq. (1) are $$\mathrm{Re}\{a(x,t)\exp\{j2\pi f_o t\}\}=\{a(x,t)\exp\{j2\pi f_o t\}+a^*(x,t)\exp\{-j2\pi f_o t\}\}\{2\}^{-1} \qquad (2)$$

and $$\mathrm{Im}\{a(x,t)\exp\{j2\pi f_o t\}\}=\{a(x,t)\exp\{-j2\pi f_o t\}-a^*(x,t)\exp\{-j2\pi f_o t\}\}\{2j\}^{-1} \qquad (3)$$

respectively, where $a^*(x,t)$ is the complex conjugate of $a(x,t)$. The desired transmit excitation is $$\int dx\, a(x,t)\exp\{j2\pi f_o t\}, \qquad (4)$$

where, of course, the integration is effected in practice by summation in space over a plurality of transmit channels. Step one of this embodiment transmits only the real part of this $$\mathrm{Re}\{\int dx\, a(x,t)\exp\{j2\pi f_o t\}\}=\int dx\, \mathrm{Re}\{a(x,t)\exp\{j2\pi f_o t\}\}, \qquad (5)$$

and step four similarly transmits only the imaginary part. The spatio-temporal signal sensed on reception during step two can be expressed as the output of an operation $H_{x,t}$ that maps the insonification to arbitrary points in space and time. $H_{x,t}$ thus encapsulates the characteristics of the body under examination. We may not know much about this operator a prion, but we do know that it is substantially linear under conditions of diagnostic ultrasonic insonification (i.e., superposition holds) and hermitian in its frequency domain representation (i.e., real input signals result in real output signals). The signal sensed on reception in step two at spatial location x and time t can be represented as $$H_{x,t}\{\int dx\, \mathrm{Re}\{a(x,t)\exp\{j2\pi f_o t\}\}\}, \qquad (6)$$

and similarly for the signal sensed on reception in step five $$H_{x,t}\{\int dx\, \mathrm{Im}\{a(x,t)\exp\{j2\pi f_o t\}\}\}, \qquad (7)$$

These signals are pure real, and their region of support in the frequency domain is the same as that of the transmit excitation signal of eq. (5). If we define a linear reception operator $R_{x,y}$ (which may include sampling, delaying, phasing, weighting, filtering, frequency translation, sample rate conversion and other linear operations), then step three stores $$R_{x,y}\{H_{x,t}\{\int dx\, \mathrm{Re}\{a(x,t)\exp\{j2\pi f_o t\}\}\}\}, \qquad (8)$$

and step six effects $$R_{x,y}\{H_{x,t}\{\int dx\, \mathrm{Re}\{a(x,t)\exp\{j2\pi f_o t\}\}\}\}+jR_{x,y}\{H_{x,t}\{\int dx\, \mathrm{Im}\{a(x,t)\exp\{j2\pi f_o t\}\}\}\}, \qquad (9)$$

which, by superposition, is equivalent to $$R_{x,y}\{H_{x,t}\{\int dx\, a(x,t)\exp\{j2\pi f_o t\}\}\}, \qquad (10)$$

which is the desired result.

This result holds even when $a(x,t)$ is not a bandlimited baseband signal, and is similar to single-sideband modulation in that it cancels the unwanted sideband (in this case, the second terms on the right hand side of eqs. (2) and (3)) and reinforces the desired one (the first terms on the right hand side of eqs. (2) and (3)).

Prior art and common practice specify the reception operator $R_{x,y}$ to be insensitive to the unwanted sideband (an approach which requires bandwidth constraints on $a(x,t)$) and thereby require a higher sampling rate in the case of a single transmit excitation.

Sampling Considerations

The method described above, in contrast to the prior art, permits a reception operator that is sensitive to the unwanted sideband; the method thereby permits a substantially lower sample rate to be accommodated on reception.

Let a(x,t) be bandlimited to $(-f_O, f_O)$. We can represent the desired received signal at location x as $$H_{x,t}\{\int dx\, a(x,t)\exp\{j2\pi f_O t\}\} = b(x,t)\exp\{j2\pi f_O t\}. \tag{11}$$

Let the reception operator $R_{x,y}$ sample with periodicity T; in the following we will ignore the other linear operations required of $R_{x,y}$ for beamformation, as the result is independent of them. The samples stored in step two are $$R_{x,y}\{H_{x,t}\{\int dx\, \mathrm{Re}\{a(x,t)\exp\{j2\pi f_O t\}\}\}\} = \{b(x,nT)\exp\{j2\pi f_O nT\} + b^*(x,nT)\exp\{-j2\pi f_O nT\}\}\{2\}^{-1}, \tag{12}$$

and the samples acquired in step five are $$R_{x,y}\{H_{x,t}\{\int dx\, \mathrm{Im}\{a(x,t)\exp\{j2\pi f_O t\}\}\}\} = \{b(x,nT)\exp\{j2\pi f_O nT\} - b^*(x,nT)\exp\{-j2\pi f_O nT\}\}\{2j\}^{-1}. \tag{13}$$

Thus step six yields $$b(x,nT)\exp\{j2\pi f_O nT\}, \tag{14}$$

which is the desired result. Given the bandwidth constraints on b(x,t), it is obvious that the sample rate is adequate in principle provided $T^{-1}$ is greater than or equal to $2f_O$. In the special case of $T^{-1} = 2f_O$, eq. (14) takes on the simple form $$b(x,nT)(-1)^n. \tag{15}$$

This is in contrast to the prior art, which typically requires a sampling frequency $T^{-1}$ greater than or equal to $4f_O$.

Benefits of the Method

By exploiting the bandlimitedness of the signals under consideration, and attending to their proper representation in the Nyquist band $(0, 2f_O)$, the sample frequency on reception need be no higher than $2f_O$. Demodulation to baseband is particularly simple when the sample frequency equals $2f_O$, involving only periodic reversals of sign. This permits a digital system, which is always constrained to some maximum sample rate, to operate at a higher imaging frequency than would otherwise be possible.

The cost in performance of the method is a reduction in achievable frame rate, as each beam is developed through two successive transmit excitations. In practical imaging systems this may be offset by the increased line rate available at higher frequencies due to decreased penetration.

The method described above can be used with multiple beam transmit and receive beamformers and synthetic line techniques as described in U.S. Pat. Nos. 5,675,554, 5,623,928, and 5,667,373 and U.S. patent application Ser. No. 08/432,615. The method is enhanced if the body under examination is substantially stationary during the two excitations and receptions necessary to form a line; clinical experience indicates that this requirement is generally met in practice.

Specific Examples

Figure 1:
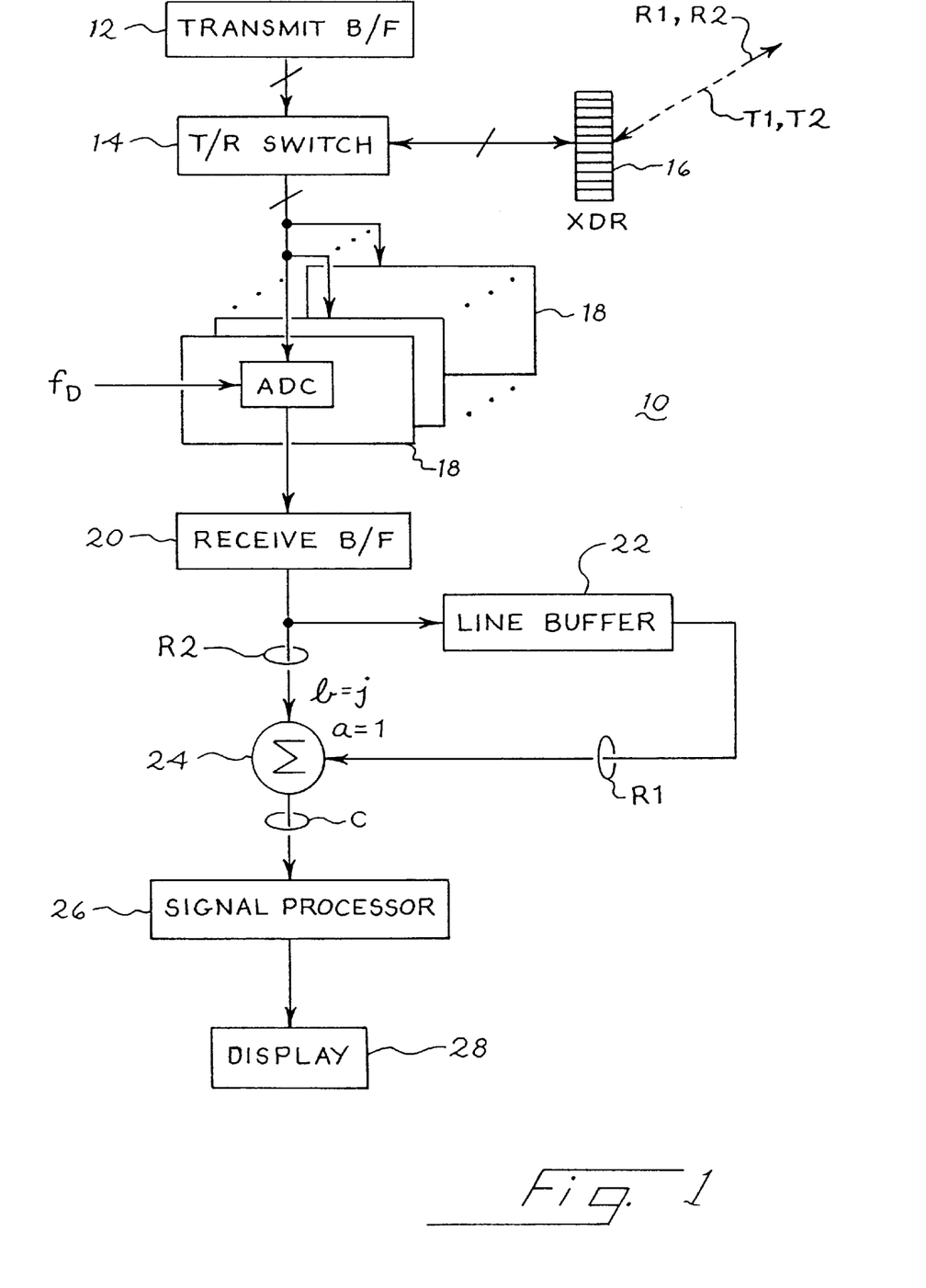
FIG. 1 is a block diagram of an ultrasonic imaging system that incorporates a first presently preferred embodiment of this invention.

Turning now to the drawings, FIG. 1 shows a block diagram of an ultrasonic imaging system 10 that incorporates a preferred embodiment of this invention. The imaging system 10 includes a transmit beamformer 12 that applies a plurality of transmit signals to individual transducer elements of a transducer array 16 via a transmit/receive switch 14. The transmit signals supplied by the transmit beamformer 12 are phased to cause constructive interference in a transmit beam at a selected range and a selected steering direction.

Echo signals from the transmit beams are received by the transducer elements of the transducer array 16 and passed via the transmit/receive switch 14 to a plurality of analog to digital converters 18 (ADC's). Preferably a separate ADC 18 is provided for each element or each group of adjacent elements of the transducer array 16. The ADC's 18 digitize the backscattered signals at a sampling rate $f_D$, and the digitized backscattered signals are supplied by the ADC's 18 to a receive beamformer 20, where conventional delays and/or phase shifts and/or phase rotations are used to coherently sum the digitized signals in order to produce one or more receive beams for each transmit beam. The beamformed output signals from the receive beamformer 20 are supplied to a line buffer 22 and to a summer 24. The line buffer 22 and the summer 24 are controlled such that the receive beams are processed in sets of two. In FIG. 1 receive beam R1 is stored in the line buffer 22 until it can be added to receive beam R2 in the summer 24. The summer 24 is a weighting summer that weights the receive beam R1 by the weighting factor a (equal to 1 in this embodiment) and the receive beam R2 by the weighting factor b (equal to j, the square root of negative 1, in this embodiment). The output of the summer 24 is a composite signal C that is supplied to a conventional signal processor 26 which forms an image signal that is displayed on the display 28.

Figure 2:
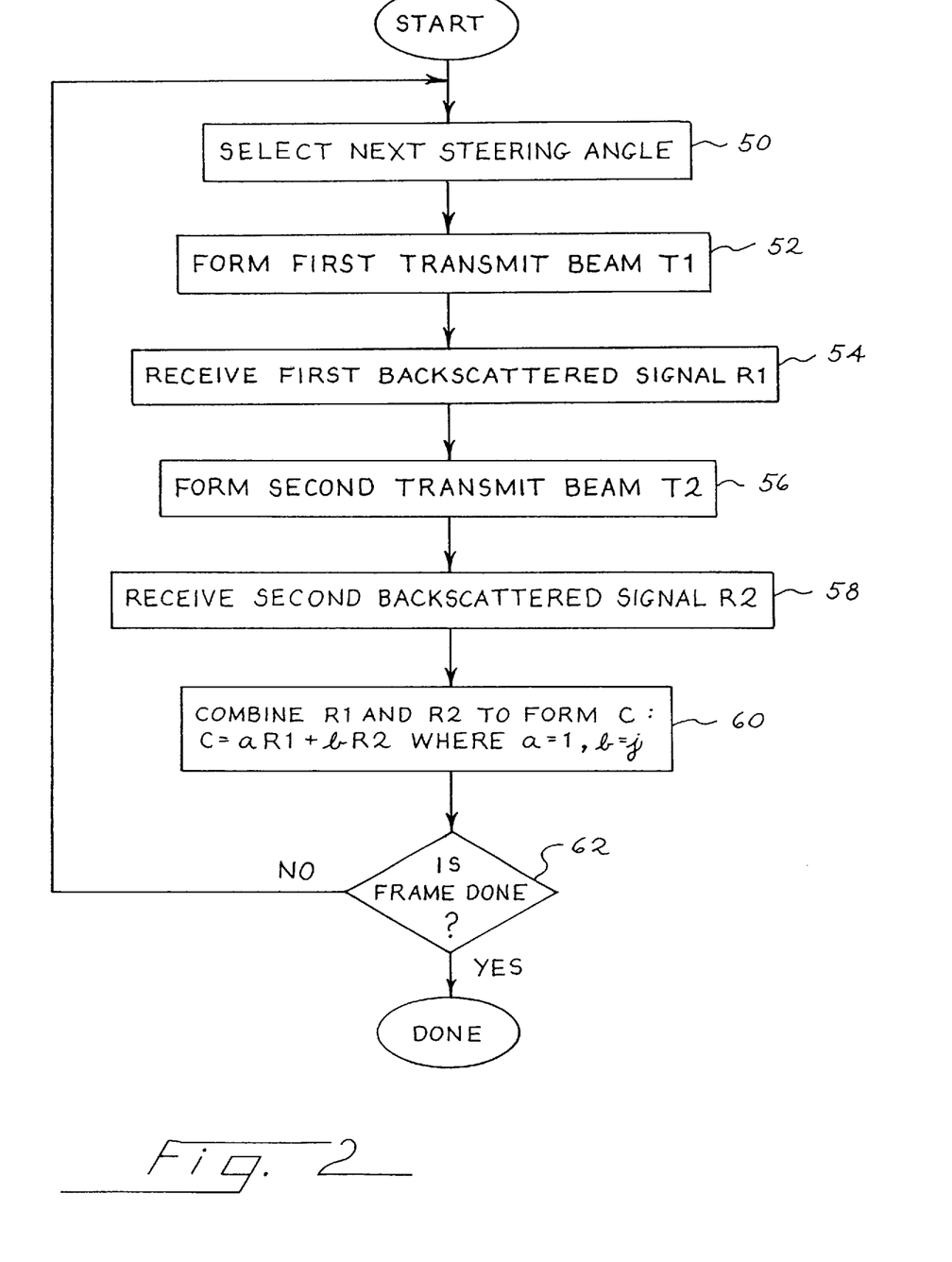
FIG. 2 is a flow chart of a method practiced by the embodiment of FIG. 1.

FIG. 2 provides a flow chart of a method performed by the system 10 of FIG. 1. As shown in FIG. 2, the first step 50 is to select a next steering angle. Then a first transmit beam T1 is formed along the selected steering angle in step 52, and a first backscattered signal R1 is received in step 54. Then a second transmit beam T2 is formed along with same steering angle in step 56, and a second backscattered signal R2 is received in step 58. In this method both of the transmit beams T1, T2 are collinear, and both of the backscattered signals R1, R2 are receive beams that are collinear with the transmit beams T1, T2.

T1 and T2 can take the following general form as a function of time t::

$$T1(t) = \mathrm{Re}\{a(t)e^{j2\pi f_0 t}\}$$
$$= a_r(t)\cos 2\pi f_0 t - a_i(t)\sin 2\pi f_0 t;$$

$$T2(t) = \mathrm{Im}\{a(t)e^{j2\pi f_0 t}\} = \mathrm{Re}\{a(t)e^{j2\pi f_0 t - j\frac{\pi}{2}}\}$$
$$= a_r(t)\sin 2\pi f_0 t + a_i(t)\cos 2\pi f_0 t;$$

where $a(t) \triangleq a_r(t) + ia_i(t)$, and $a_r(t)$, $a_i(t)$ are both real.

In step 60 the backscattered signals R1 and R2 are combined to form the composite signal C by summing a·R1 with b·R2, where a equals 1 and b equals j in this embodiment. In step 66 the method branches depending upon whether the frame is complete. If not, control is returned to step 50; if the frame is complete the method is done.

Figure 3:
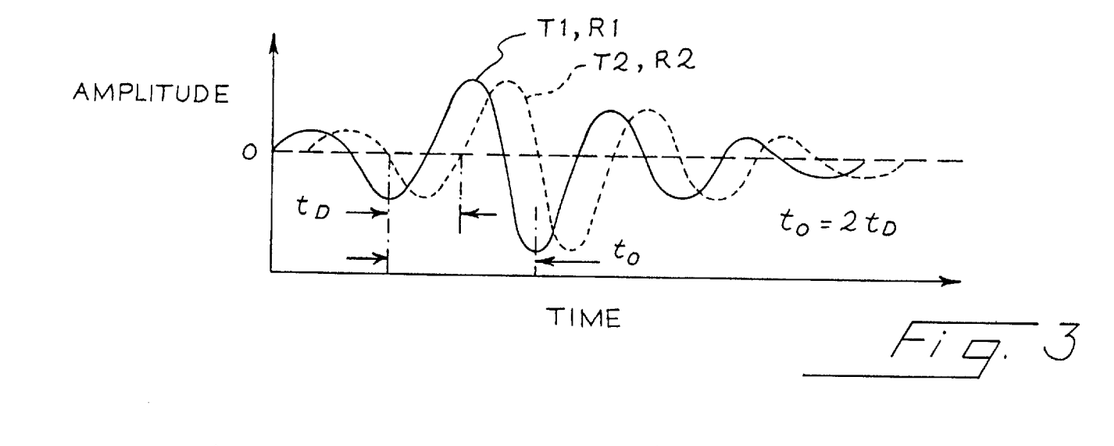
FIG. 3 is a waveform diagram illustrating operation of the embodiment of FIG. 1 and the method of FIG. 2.

FIG. 3 shows a waveform diagram of the two transmit beam signals T1 and T2 for the case where T2 is offset by a phase angle of about 90° with respect to T1. In this context the phase angle is measured as a fraction of the carrier frequency $f_O$ of the transmit beams T1, T2. FIG. 3 also shows the backscattered signals R1, R2, which are similar to the transmitted signals T1, T2, except for a gain change which is not illustrated. Note that the period of the signals T1, T2, R1, R2 is $t_0$. FIG. 3 also shows the time $t_D$ between adjacent samples taken by the ADC 18. In this embodiment $t_0$ is equal to two times $t_D$.

The time delay of $\pm t_0/4$ is an approximation, i.e., $T2(t) \cong T1(t - t_0/4)$, assuming the envelope is low frequency compared to $f_O$ (i.e. $a(t) \cong a(t - t_0/4)$).

Figure 4:
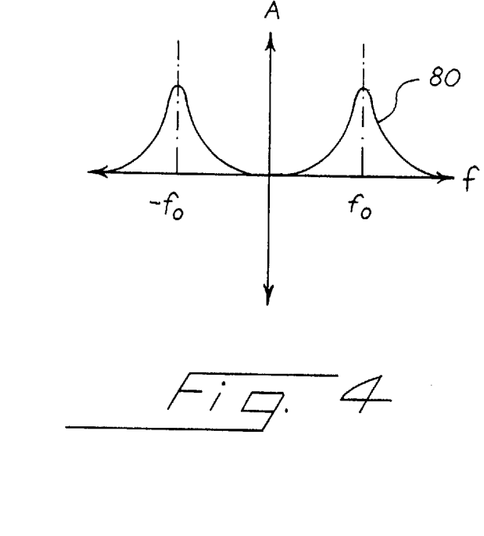
FIGS. 4, 5 and 6 are frequency spectra illustrating the operation of the system of FIG. 1 and the method of FIG. 2.
Figure 5:
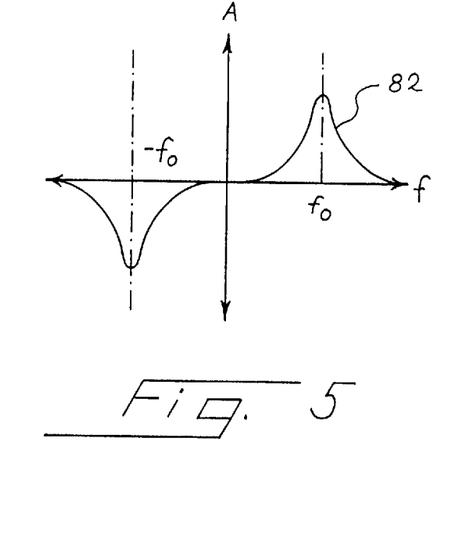
Figure 6:
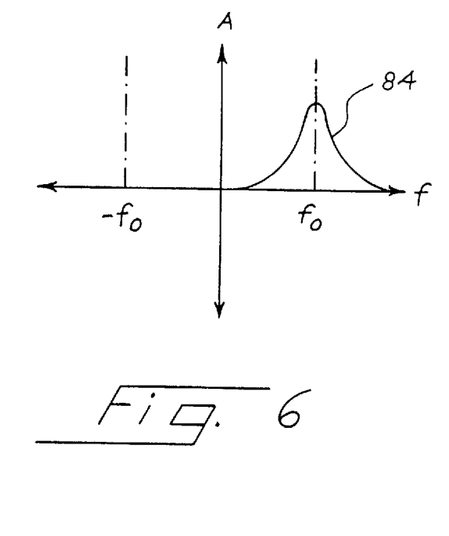

FIGS. 4, 5 and 6 are frequency spectrum diagrams for the transmit beams T1, T2 and the composite signal C, respectively. (FIG. 5 plots the spectrum after multiplication by j.) Note that the transmit signals T1 and T2 are identical with respect to positive frequency components, but that negative frequency components are inverted in T2 with respect to T1. The result is that in the composite signal C (the weighted sum of the receive signals R1, R2) the negative frequency components cancel out, and the frequency range of the composite signal C is approximately one-half of the frequency range of the transmit signals T1, T2 and the individual receive signals R1, R2. It is for this reason that the sampling rate of the ADC 18 can be made slower than usual, in this embodiment only twice the carrier frequency.

Figure 7:
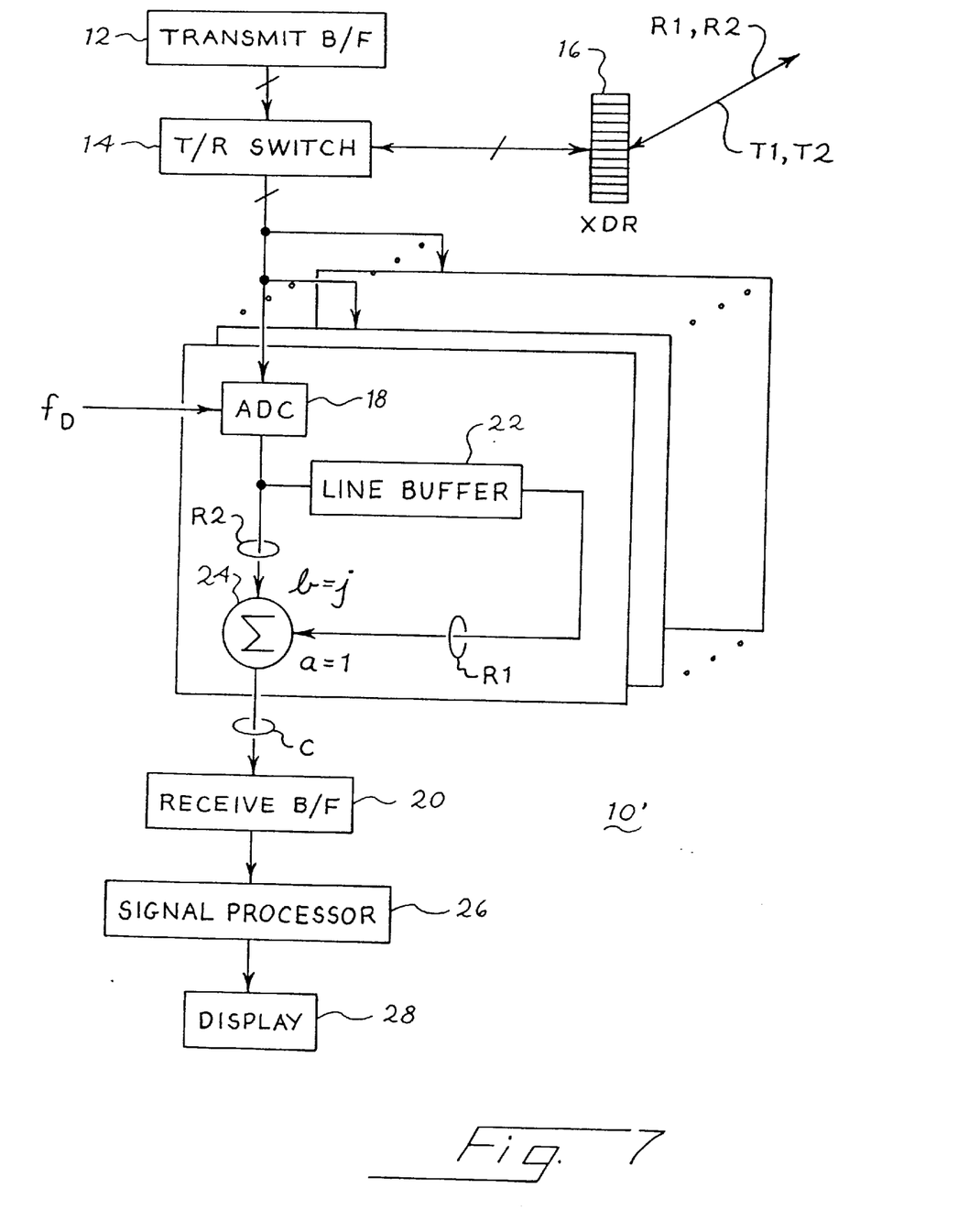
FIG. 7 is a block diagram of an ultrasonic imaging system that incorporates a second preferred embodiment of this invention.

FIG. 7 provides a block diagram of an alternate system 10' for implementing the present invention. The various components of FIG. 7 are similar to those of FIG. 1, except in this case the line buffer 22 and the summer 24 are placed between the A to D converter 18 and the receive beamformer 20. In this case the backscattered signals R1, R2 are individual transducer signals, prior to beamformation.

In the foregoing, the scale factors (a,b) and transmit phase can be chosen to select a positive frequency spectrum. Alternatively, scale factors and transmit phase can be chosen to select a negative frequency spectrum, i.e., for positive frequencies: $R(t)=R1(t)+jR2(t)$; for negative frequencies:

$$R(t)=R1(t)-jR2(t).$$

The linear case embodiments provide the advantage of increased system bandwidth for a given sampling frequency. The bandwidth of the linear component is approximately equal to the sampling frequency. No negative image filter is required and potentially higher output sample rates are made possible. Furthermore, noise can be reduced, because aliasing of the filtered negative image is eliminated (the negative image is inherently canceled). Moreover, since the echo signals are real signals prior to demodulation and phasing, postmemory processing is reduced from four multiply operations per sample to two.

Section II—Non-Linear Case Embodiments

The foregoing description of linear case embodiments has assumed that the backscattered echo signal is primarily composed of linearly scattered signals which correspond in frequency to the frequency of the transmit beam. This invention is also useful in the non-linear case, where the backscattered echo signals include a substantial component of non-linearly scattered ultrasonic energy. Typically, the frequency spectrum of the transmit beam peaks in a fundamental frequency band, and this frequency spectrum is shaped such that substantially no harmonic energy is transmitted. The backscattered echo signal includes a large component in the fundamental frequency band, but it also includes a substantial component in a harmonic frequency band. This harmonic frequency band may be centered, for example, at a frequency twice that of the fundamental frequency band.

Certain embodiments of the present invention can be used to selectively enhance the harmonic component of the backscattered echo signal, or to selectively enhance the fundamental component of the backscattered echo signal. Derivations similar to those set out above can be used to show that the apparatus of FIGS. 1 or 7 and the method of FIG. 2 can be used to enhance the fundamental component and suppress the harmonic component by setting the weighting parameters a and b to equal real values. For example, a and b can both be set equal to 1. Similarly, derivations similar to those set out above can be used to show that the apparatus of FIGS. 1 and 7 and the method of FIG. 2 can be used to selectively enhance the harmonic component and to suppress the fundamental component of the combined signal by setting the weighting parameters a, b to equal magnitudes, where a is a real magnitude and b is an imaginary magnitude. For example, a can be set equal to 1 and b can be set equal to −j.

For T1(t), T2(t) as described above, non-linearly backscattered echo signals R1(t), R2(t) can take the following form:

$$R1(t)=b(t)e^{j4\pi f_o t}+b^*(t)e^{-j4\pi f_o t}+a(t)e^{j2\pi f_o t}+a^*(t)e^{-j2\pi f_o t}$$

$$R2(t)=b(t)e^{j4\pi f_o t}-b^*(t)e^{-j4\pi f_o t}-ja(t)e^{j2\pi f_o t}+ja^*(t)e^{-j2\pi f_o t},$$

where $b(t)=a^2(t)$.

R1(t) and R2(t) can be combined to recover the fundamental component and to reject the harmonic component:

$$R(t)=R1(t)+R2(t)=(1-j)a(t)e^{j2\pi f_o t}+(1+j)a^*(t)e^{-j2\pi f_o t}$$

In this case, R(t) has a bandwidth of $4f_O$ so is preferably sampled at $f_d \geq 4f_O$, the conventional sampling requirement.

Alternatively, R1(t) and R2(t) can be combined to recover the harmonic component and to reject the fundamental component:

$$R(t) = R1(t) - jR2(t)$$
$$= (1+j)b(t)e^{j4\pi f_o t} + (1+j)b^*(t)e^{-j4\pi f_o t} + 2a^*(t)e^{-j2\pi f_o t}.$$

In this case R(t) has bandwidth of $8f_O$ and is preferably sampled at $f_D \geq 8f_O = 4f_H$, where $f_H = 2f_O$.

The fundamental and harmonic components can be recovered in parallel using the same data:

$$R_F(t)=R1(t)+R2(t)$$

$$R_H(t)=R1(t)-jR2(t)$$

The sampling requirement can be reduced in the non-linear case without fundamental rejection:

$$T1(t)=\text{Re}\{a(t)e^{j2\pi f_o t}\}$$

$$T2(t) = \text{Re}\{a(t)e^{j2\pi f_o t - j\frac{\pi}{4}}\}$$

$$R1(t)=b(t)e^{j4\pi f_o t}+b^*(t)e^{-j4\pi f_o t}+a(t)e^{j2\pi f_o t}+a^*(t)e^{-j2\pi f_o t}$$

$$R2(t) = b(t)e^{j4\pi f_o t - j\frac{\pi}{2}} + b^*(t)e^{-j4\pi f_o t + j\frac{\pi}{2}} + a(t)e^{j2\pi f_o t - j\frac{\pi}{4}} + a^*(t)e^{-j2\pi f_o t + j\frac{\pi}{4}}$$

$$R(t)=R1(t)+jR2(t)=b(t)e^{j4\pi f_o t}+a^*(t)(1+j)e^{j2\pi f_o t}/\sqrt{2}+a^*(t)(-1+j)e^{-j2\pi f_o t}/\sqrt{2}.$$

In this case R(t) has bandwidth of $\sim 6f_O$ and is preferably sampled at $f_D \geq 6f_O = 3f_H$, where $f_H = 2f_O$. R(t) can then be conventionally filtered to remove the fundamental component.

Alternatively, four firings can be used to cancel the fundamental component while preserving the advantage of a low sample rate:

$$T1(t)=\text{Re}\{a(t)e^{j2\pi f_o t}\}$$

$$T2(t) = \text{Re}\{a(t)e^{j2\pi f_o t - j\frac{\pi}{4}}\}$$

$$T3(t) = \text{Im}\{a(t)e^{j2\pi f_o t}\}$$

$$T4(t) = \text{Im}\{a(t)e^{j2\pi f_o t - j\frac{\pi}{4}}\}$$

$$R(t) = R1(t) - jR2(t) + jR3(t) + R4(t)$$

R(t) can be sampled at $f_D = 2f_H$, and the fundamental component is rejected in R(t).

With a $\pi/2$ phase shift, the benefit in the non-linear case is to improve the range resolution; the sampling requirement is $f_D \geq 4f_{RCV}$, $$\text{where } f_{RCV} = \begin{cases} f_0 \text{ to recover the fundamental component} \\ 2f_0 \text{ to recover the harmonic component or} \\ \text{the fundamental and harmonic components} \end{cases}$$

As used herein the term "complex weighting factor" is intended broadly to encompass any weighting factor that can be expressed in the form L+jM, understanding that either L or M may be 0.

In general, the weighting parameters a, b can be set to desired complex numbers to achieve any of the benefits described above. The embodiments discussed above provide the advantage of increased system bandwidth in harmonic imaging. Either the harmonic or the fundamental component can be rejected effectively, and the bandwidth of the harmonic component is substantially equal to the sampling frequency divided by 2. These embodiments can be used to generate independent images for compounding and associated speckle reduction by rejecting the harmonic in fundamental imaging and rejecting the fundamental in harmonic imaging.

Section III—Concluding Remarks

The methods and systems described above can be implemented using the widest variety of technologies. For example, the transmit beamformer 12 can be either of the analog or the digital type, and any suitable configuration or architecture can be used for the ADC 18, the receive beamformer 20, the line buffer 20, the summer 24, the signal processor 26, and the display 28. Any suitable transducer array 16 can be used, including one dimensional, 1.5 dimensional, and 2 dimensional arrays, of any suitable geometry.

Embodiments of the present invention are compatible with multibeam transmit beamformers (U.S. Pat. No. 5,675, 554), with transmit line focus imaging systems (U.S. Pat. No. 5,696,737), with alternating (spatially distinct) line imaging (U.S. patent application Ser. No. 09/198,219), with multibeam receive beamformers (U.S. Pat. No. 5,685,308), with synthetic and analytic line interpolation (U.S. Pat. No. 5,623,928), and synthetic aperture techniques. All of these patents are assigned to the assignee of the present invention.

As used herein the term "summing" is intended broadly to include addition and subtraction.

The order in which the transmit signals T1, T2 are sent is not critical, and if desired the imaginary component of a complex transmit signal can be sent before the real component.

In certain embodiments the backscattered signals from a single set of transmit beams can be combined in two different ways to produce two different results, such as a first combination that suppresses selected fundamental components and a second combination that suppresses selected harmonic components.

The foregoing detailed description has described only a few of the many forms that this invention can take. For this reason, the foregoing description is intended by way of illustration and not limitation. It is only the following claims, including all equivalents, that are intended to define the scope of this invention.

What is claimed is:

1. An ultrasonic transmit/receive method suitable for an ultrasonic imaging system, said method comprising the following steps:
    (a) forming a first transmit beam characterized by a real portion of a selected complex insonification signal;
    (b) receiving a first backscattered signal in response to the first transmit beam;
    (c) forming a second transmit beam characterized by an imaginary portion of the complex insonification signal;
    (d) receiving a second backscattered signal in response to the second transmit beam;
    (e) combining the first and second backscattered signals.

2. An ultrasonic transmit/receive method suitable for an ultrasonic imaging method system, said method comprising the following steps:
    (a) forming first and second transmit beams characterized by a phase difference of about 90°;
    (b) receiving first and second backscattered signals in response to the first and second transmit beams, respectively; and
    (c) combining the first and second backscattered signals.

3. The method of claim 1 or 2 wherein the combining step comprises the steps of:
    weighting the first and second backscattered signals with respective first and second complex weighting factors; and
    summing the weighted first and second backscattered signals.

4. The method of claim 3 wherein the first weighting factor is proportional to 1 and the second weighting factor is proportional to j.

5. The method of claim 3 wherein the first weighting factor is proportional to 1 and the second weighting factor is proportional to 1.

6. The method of claim 3 wherein the first weighting factor is proportional to j and the second weighting factor is proportional to 1.

7. The method of claim 1 or 2 wherein the first and second backscattered signals comprise respective receive beamformed signals.

8. The method of claim 7 wherein the beamformed signals are substantially collinear.

9. The method of claim 8 wherein the first and second transmit beams are substantially collinear.

10. The method of claim 1 or 2 wherein the first and second backscattered signals comprise respective receive transducer signals.

11. The method of claim 1 or 2 further comprising the step of digitizing the first and second backscattered signals.

12. The method of claim 11 wherein the first and second backscattered beams are characterized by a central frequency $f_O$, wherein the digitizing step is characterized by a digitizing frequency of $f_D$, and wherein $f_D$ is less than $4f_O$.

13. The method of claim 12 wherein $f_D$ is substantially equal to twice $f_O$.

14. The method of claim 1 or 2 wherein the first and second transmit beams are substantially collinear.

15. An ultrasonic transmit/receive system for an ultrasonic imaging system, said transmit/receive system comprising:

means for forming a first transmit beam characterized by a real portion of a selected complex insonification signal;

means for receiving a first backscattered signal in response to the first transmit beam;

means for forming a second transmit beam characterized by an imaginary portion of the complex insonification signal;

means for receiving a second backscattered signal in response to the second transmit beam;

means for combining the first and second backscattered signals.

16. An ultrasonic transmit/receive system for an ultrasonic imaging system, said transmit/receive system comprising:

means for forming first and second transmit beams characterized by a phase difference of about 90°;

means for receiving first and second backscattered signals in response to the first and second transmit beams, respectively; and means for combining the first and second backscattered signals.

17. The invention of claim 15 or 16 wherein the combining means comprises:

means for weighting the first and second backscattered signals with respective first and second complex weighting factors; and a summer responsive to the weighted first and second backscattered signals.

18. The invention of claim 17 wherein the first weighting factor is proportional to 1 and the second weighting factor is proportional to j.

19. The invention of claim 17 wherein the first weighting factor is proportional to 1 and the second weighting factor is proportional to 1.

20. The invention of claim 17 wherein the first weighting factor is proportional to j and the second weighting factor is proportional to 1.

21. The invention of claim 15 or 16 wherein the first and second backscattered signals comprise respective receive beamformed signals.

22. The method of claim 21 wherein the beamformed signals are substantially collinear.

23. The method of claim 22 wherein the first and second transmit beams are substantially collinear.

24. The invention of claim 15 or 16 wherein the first and second backscattered signals comprise respective receive transducer signals.

25. The invention of claim 15 or 16 wherein the means for forming the first and second backscattered signals further comprise means for digitizing the first and second backscattered signals.

26. The invention of claim 25 wherein the first and second backscattered signals are characterized by a central frequency $f_O$, wherein the digitizing means is characterized by a digitizing frequency $f_D$, and wherein $f_D$ is less than $4f_O$.

27. The invention of claim 26 where $f_D$ is substantially equal to twice $f_O$.

28. The invention of claim 15 or 16 wherein the first and second transmit beams are substantially collinear.

29. An ultrasonic transmit/receive method for an ultrasonic imaging system, said method comprising the following steps:

(a) forming a first transmit beam corresponding to a first component of a complex insonification signal characterized by a first complex phase angle;

(b) receiving a first backscattered signal in response to the first transmit beam;

(c) forming a second transmit beam corresponding to a second component the complex insonification signal characterized by a second complex phase angle;

(d) receiving a second backscattered signal in response to the second transmit beam;

(e) combining the first and second backscattered signals;

wherein the first and second complex phase angles are separated by a complex phase separation angle, and wherein the complex phase separation angle differs from an integer multiple of 180° by more than X°, where X is greater than 1.

30. The method of claim 29 wherein X is greater than 5.
31. The method of claim 29 wherein X is greater than 10.
32. The method of claim 29 wherein X is greater than 20.
33. The method of claim 29 wherein X is greater than 40.
34. The method of claim 29 wherein X is greater than 60.
35. The method of claim 29 wherein X is greater than 80.

36. An ultrasonic transmit/receive system for an ultrasonic imaging system, said transmit/receive system comprising:

(a) means for forming a first transmit beam corresponding to a first component of a complex insonification signal characterized by a first ts complex phase angle;

(b) means for receiving a first backscattered signal in response to the first transmit beam;

(c) means for forming a second transmit beam corresponding to a second component the complex insonification signal characterized by a second complex phase angle;

(d) means for receiving a second backscattered signal in response to the second transmit beam;

(e) means for combining the first and second backscattered signals;

wherein the first and second complex phase angles are separated by a complex phase separation angle, and wherein the complex phase separation angle differs from an integer multiple of 180° by more than X°, where X is greater than 1.

37. The invention of claim 36 wherein X is greater than 5.
38. The invention of claim 36 wherein X is greater than 10.
39. The invention of claim 36 wherein X is greater than 20.
40. The invention of claim 36 wherein X is greater than 40.
41. The invention of claim 36 wherein X is greater than 60.
42. The invention of claim 36 wherein X is greater than 80.

43. An ultrasonic transmit/receive method for an ultrasonic imaging system, said method comprising the following steps:

(a) forming a set of at least three transmit beams to corresponding to at least three respective components of a complex insonification signal, each of the transmit beams characterized by a respective complex phase angle;

(b) receiving at least three backscattered signals in response to the transmit beams; and (c) combining the at least three backscattered signals;

wherein the complex phase angles for the transmit beams correspond to at least three different angles.

44. The method of claim 43 wherein the set of transmit beams comprises four transmit beams, and wherein the complex phase angles for the transmit beams correspond to four different angles.

45. An ultrasonic transmit/receive method for an ultrasonic imaging system, said method comprising the following steps:

(a) forming a set of at least three transmit beams corresponding to at least three respective components of a complex insonification signal, each of the transmit beams characterized by a respective complex phase angle;

(b) receiving at least three backscattered signals in response to the transmit beams; and (c) weighting the backscattered signals; and (d) combining the weighted backscattered signals;

wherein the transmit beams of the set are all spatially aligned with one another.

46. The method of claim 45 wherein the weighting step comprises the step of applying weights to the respective backscattered signals, wherein at least two of the weights differ in magnitude.

* * * * *

UNITED STATES PATENT AND TRADEMARK OFFICE
CERTIFICATE OF CORRECTION

PATENT NO. : 6,358,210 B2  
DATED : March 19, 2002  
INVENTOR(S) : Albert Gee et al.

Page 1 of 1

It is certified that error appears in the above-identified patent and that said Letters Patent is hereby corrected as shown below:

Column 2,  
Line 49, delete "$+a*(t) e^{-(2\pi f_o t + \theta_k)}\}$" and substitute -- $+a*(t) e^{-j(2\pi f_o t + \theta_k)}\}$ -- in its place.

Column 3,  
Line 24, delete "$+e^{j\theta_k} A*(f+f_o))+e^{j\theta_k} A$" and substitute -- $+e^{-j\theta_k} A*(-(f+f_o))+e^{j\theta_k} A$ -- in its place.  
Line 62, delete "$e^{j2\theta_2}$" and substitute -- $e^{-j2\theta_2}$ -- in its place.

Column 5,  
Line 65, delete "fo" and substitute -- $f_o$ -- in its place.

Column 6,  
Line 5, delete "$\{-j2\pi f_o t\}-a*$" and substitute -- $\{j2\pi f_o t\}-a*$ -- in its place.

Line 25, delete "a prion," and substitute -- a priori, -- in its place.

Column 7,  
Line 25, delete "T-1" and substitute -- $T^{-1}$ -- in its place.

Column 14,  
Line 31, delete "ts" before the word "complex".

Signed and Sealed this

Twenty-sixth Day of November, 2002

Attest:

JAMES E. ROGAN  
*Attesting Officer*  *Director of the United States Patent and Trademark Office*